July 5, 1949.  D. E. STEARNS  2,474,920

PIPE LINE SADDLE

Filed May 20, 1946

DICK E. STEARNS
INVENTOR.

BY J. Vincent Martin
and
Ralph R. Browning

ATTORNEY

Patented July 5, 1949

2,474,920

UNITED STATES PATENT OFFICE 2,474,920

PIPE-LINE SADDLE

Dick E. Stearns, Shreveport, La.

Application May 20, 1946, Serial No. 670,984

6 Claims. (Cl. 248—49)

This invention relates to improvements in anchors for pipe lines and has for its general object the provision of an anchor which is non-injurious to a pipe line with which it is associated.

While useful for pipe lines generally, the device is especially desirable for use in anchoring pipe lines whose outside diameters range between 12¾" to 26" or larger. The necessity for anchoring these pipe lines arises particularly when the pipe line crosses land which is subjected to overflow or which is marshy or swampy in character. The need for anchoring pipe lines is especially true where the pipe line contains light fluids such as gases. In addition to gas transmission lines this includes water, oil or gasoline lines or the like during shut down periods when the lines are drained. Such pipe lines, when submerged in fluids or semi-fluids have a tendency to float and in many cases the displacement of the pipe line is such that the line will actually float if not held in place by means other than its own normal weight. For example, a 24" pipe line of typical wall thickness filled with gas will have an upward or buoyant force of 100# per foot of length when submerged in water.

Heretofore weights have been attached to pipe lines at various intervals. However, these weights do not provide a positive anchoring of the pipe line. In addition, the application of these weights usually is injurious to the corrosion prevention coatings which are customarily applied to pipe lines. These pipe line coatings have various degrees of hardness but ordinarily are rather easily ruptured or broken.

The primary object of this invention is the provision of a pipe line saddle constructed and arranged to distribute the upward bearing forces resulting from the buoyancy of the pipe line over a sufficient area of the pipe coating to result in a low unit bearing force which will not damage the pipe line coating.

Another object is the provision of a lightweight, flexible pipe line saddle adapted to be readily installed after the pipe line has been placed in its final resting position.

A further object is to provide a one piece pipe line saddle of comparatively thin sheet metal having a long flexible central portion bowed to enable it to readily conform to the crest of the pipe line and angularly disposed side portions stiffened by gussets and flanges whereby a single anchor rod for each side portion is sufficient to hold the saddle in place and whereby the forces asserted by such anchor rods are distributed substantially uniformly over the entire central portion of the saddle with consequent low unit bearing pressure on the pipe line coating.

Other objects and advantages will be apparent from the following description taken in connection with the accompanying drawings showing by way of example a preferred embodiment of this invention.

Figures 2, 3:
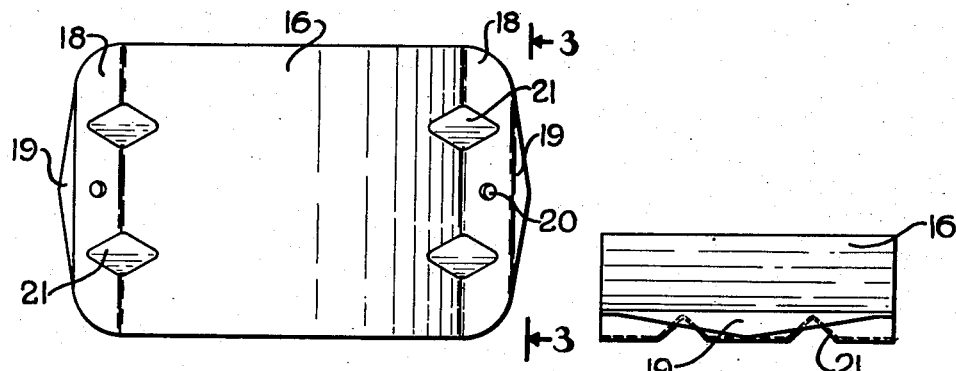
Fig. 2 is a plan view.

Fig. 3 a side view of the saddle detached from the pipe line, and

Figure 4:
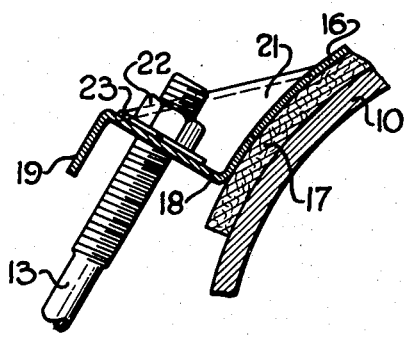

Fig. 4 is an enlarged fragmentary sectional view through one side portion of the saddle and adjacent parts when secured upon the pipe line by an anchor rod.

Figure 1:
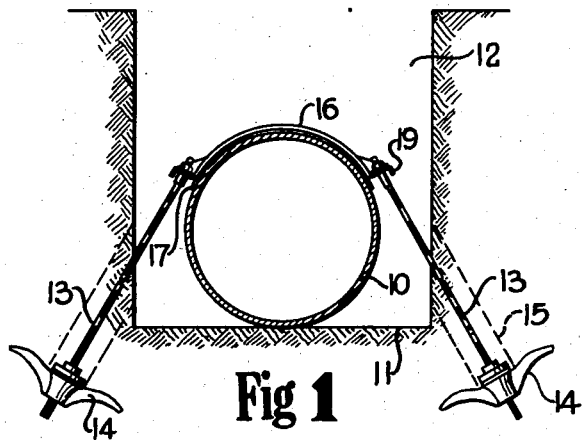
Fig. 1 shows an end elevation of one of my improved saddles anchoring a pipe line, which is shown in section resting upon the bottom of a trench.

Referring now to the drawings, the numeral 10 designates a pipe line of the type ordinarily employed for transport of oils, natural gas, vaporized petroleum products, steam, or the like, and in Fig. 1 is shown as resting upon the bottom 11 of a trench 12 in the customary manner of embedding such pipe lines. Assuming the pipe line 10 to be 24" in diameter, the trench 12 would be approximately 36" in width, a clearance of approximately 6" on each side of the pipe line being customarily provided. Accordingly the pipe line is shown in Fig. 1 in its final resting place, and my improved saddle and co-acting anchor rods, suitably spaced along the line, will maintain the pipe line in such desired position, despite the buoyant force produced by submergence or partial submergence in water or other fluids or semi-fluids. As best shown in Fig. 1, anchor rods 13 are secured at their lower extremities within the ground at opposite sides of and below the bottom of trench 12. As herein shown an expanding anchor 14 is threaded upon the lower extremity of each anchor rod 13 and embedded in the earth at the lower extremity of an auger hole 15 bored diagonally through the side wall of the trench a short distance from the bottom. An auger hole of approximately 5" diameter will permit the insertion of the expanding anchor with its wings folded, then efforts to withdraw the inserted anchor will tend to force the wings outwardly to securely hold the anchor rod in position. It will be noted that the diagonal disposition of such auger holes enable their ready formation by customary tools with the pipe line in final position within the trench. In other words, my improved anchoring device may be mounted at desired locations after the pipe line has been laid.

As best shown in Figs. 2 and 4, the saddle is preferably formed from a single piece of light guage sheet metal with a central portion 16 of substantial length, as for example 18", bowed laterally to substantially conform to the shape of the upper portion of the pipe line. This central portion 16, when in place upon the pipe line, rests upon an expansion strip or cushion 17, of appreciable thickness, as ½", and formed of fiber, asbestos or other suitable material. The expansion strip 17 is substantially the same length as the central portion 16 of the saddle and extends laterally beyond the side edges of such central portion for a short distance, as shown in Fig. 4. The width of the central portion 16 is sufficient to cover the crest of the pipe line, and enable ready pull downward of the entire pipe when anchor rods are secured to the saddle. As herein shown, approximately ⅓ of the periphery of the pipe is covered by the central portion 16 of the saddle, which extends about 60° on each side of the vertical axis of the pipe line. At each side of the central portion 16, the saddle is formed with an angularly extending side portion 18, stiffened to enable firm mounting of the saddle upon the anchor rods 13 and also distribute forces from such anchor rods substantially uniformly over the central portion 16. Each side portion 18 is formed with a main flange extending the full length of the central portion 16 and bent to a position substantially radially of the arc on which the central portion 16 is bowed, and an auxiliary flange 19 downturned at the edge of the main saddle flange. The auxiliary flange 19 acts as a beam to reinforce the outward edge of side portion 18 and is preferably tapered toward each end of the main flange for streamlining the structure by deletion of non-functional metal. Substantially centrally of the main flanges are apertures 20, slightly greater in diameter than of the anchor rods 13. Between each end of the saddle and apertures 20, a gusset 21 is pressed into the metal of the main flanges of side portions 18 and adjacent sections of the central portion 16, substantially as shown in Figs. 2 and 4. The positioning of the gussets 21 is of importance in enabling the distribution of forces exerted upon the main flanges adjacent apertures 20 substantially uniformly over the entire central portion 16 of the saddle.

In use, the anchor rods 13 are first positioned and then the expansion strip 17 laid upon the crest of the pipe line 10, whereupon the saddle is laid upon strip 17 with an anchor rod 13 extending through the aperture 20 of each side flange 18 of the saddle. The expansion strip 17 is adjusted into substantially the position shown in Figs. 1 and 4 and then the saddle is secured upon the anchor rods by suitable means, as, for example, by use of nuts 22 and washers 23.

It will be noted that the arrangement is such that only a single anchor rod 13 is required on each side of the saddle to hold it in position upon the pipe line, retaining the pipe line in its desired position substantially centrally of the trench 12. The expansion strip 17 is made of resilient or compressible material which permits slight movement of the pipe line relative to the saddle which is occasioned either by the buoyancy of the pipe line or due to the contraction or expansion of the pipe line, occasioned by temperature changes. Forces exerted upon the saddle directly from the pipe line, as due to the buoyancy of the pipe line, are obviously uniformly distributed over the entire central portion 16 of the saddle, and all forces exerted from the anchor rods 13 are also distributed over the entire central portion 16 because of the stiffening of the side portions 18 of the saddle by gussets 21 and auxiliary flanges 19. The positioning of the gussets 21 and edge flange 19 permits use of comparatively thin sheet steel, as 10 guage, or other suitable sheet material, to form a saddle with sufficiently stiff side portions 18 and a flexible central portion 16 of comparatively large area over which forces are distributed substantially uniformly with consequent low unit bearing force on the pipe coating.

While I have illustrated and described what I now regard as a practical and efficient construction for the embodiment of the proposed improvements, it is to be understood that the form of construction shown is merely illustrative and susceptible of various changes or modifications within the spirit and scope of my invention.

Having described my invention, I claim:

1. Means for anchoring a pipe line within a trench including anchor rods angularly disposed at each side of the pipe line and having their lower extremities embedded, and a saddle having a flexible central portion of large area conforming to the crest of the pipe line, side portions angularly disposed relatively to said central portion and secured to the upper extremities of said anchor rods, and stiffener portions between the side portions and central crest portion spaced on both sides of the connections between the side portion and anchor rods.

2. Means for anchoring a pipe line within a trench including anchor rods angularly disposed at each side of the pipe line and having their lower extremities embedded below and at the sides of the trench, an expansion strip resting upon the upper portion of the pipe line, and a sheet metal saddle of large area resting upon said expansion strip and having flanged side portions secured to the upper extremities of said anchor rods.

3. Means for anchoring a pipe line within a trench including anchor rods angularly disposed at each side of the pipe line and having their lower extremities embedded below and at the sides of the trench, an expansion strip resting upon the upper portion of the pipe line, and a sheet metal saddle resting upon said expansion strip, said saddle being formed with a flexible central portion of large area engaging said expansion strip and angularly extending side portions apertured to receive the upper extremities of said anchor rods, and securing means upon the anchor rods pressing the saddle and expansion strip downwardly upon the pipe line.

4. Means for anchoring a pipe line within a trench including anchor rods angularly disposed at each side of the pipe line and having their lower extremities embedded, a saddle having a flexible central portion of large area conforming to the crest of the pipe line, and side portions angularly disposed relatively to said central portion and secured to the upper extremities of said anchor rods, said side portions of the saddle having stiffening edge flanges and gussets between the side portions and central crest portion arranged on each side of the connection between the side portions and anchor rods so that forces exerted from the anchor rods are distributed substantially uniformly over the central portion of the saddle.

5. A one-piece sheet metal anchoring saddle adapted to be secured by anchor rods upon a pipe line, comprising a flexible central portion of large area substantially conforming to the shape of the pipe line and angularly disposed side portions adapted to be secured to said anchor rods, said side portions being centrally apertured to receive said anchor rods and stiffened by gussets arranged fore and aft of said apertures to uniformly distribute forces exerted from said anchor rods over substantially the entire central portion of the saddle.

6. A one-piece anchoring saddle of sheet material adapted to be secured by anchor rods upon a pipe line, comprising a central portion bowed to substantially conform to the upper portion of the pipe line and extending laterally over substantially one-third of the periphery of said pipe line and having a length almost equal to its width, and side portions apertured to receive said anchor rods for securing the saddle upon the pipe line, said side portions comprising flanges extending substantially the entire length of said central portion and bent to positions substantially radially of the pipe line when superimposed thereon and being stiffened by being further bent into edge flanges and gussets, whereby forces reaching said saddle adjacent said apertures are distributed substantially uniformly over the central portion of the saddle.

DICK E. STEARNS.

REFERENCES CITED

The following references are of record in the file of this patent:

UNITED STATES PATENTS

| Number | Name | Date |
|---|---|---|
| 1,424,957 | Van Tilburg | Aug. 8, 1922 |
| 1,708,231 | Moore | Apr. 9, 1929 |
| 1,744,102 | Burke | Jan. 21, 1930 |
| 2,373,439 | Wheatley | Apr. 10, 1945 |
| 2,402,682 | Shriro | June 25, 1946 |
| 2,418,539 | Anderson | Apr. 8, 1947 |